United States Patent
Koertzen

(10) Patent No.: US 7,421,593 B2
(45) Date of Patent: Sep. 2, 2008

(54) PARALLEL-CONNECTED VOLTAGE REGULATORS FOR SUPPLYING POWER TO INTEGRATED CIRCUIT SO THAT SECOND REGULATOR MINIMIZES CURRENT OUTPUT FROM FIRST REGULATOR

(75) Inventor: Henry W. Koertzen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 375 days.

(21) Appl. No.: 10/993,553

(22) Filed: Nov. 19, 2004

(65) Prior Publication Data

US 2006/0108989 A1 May 25, 2006

(51) Int. Cl.
 *G06F 1/26* (2006.01)
(52) U.S. Cl. .................. 713/300; 323/282
(58) Field of Classification Search .......... 323/282; 713/300
 See application file for complete search history.

(56) References Cited

U.S. PATENT DOCUMENTS

| 4,881,023 | A | | 11/1989 | Perusse et al. |
| 5,309,082 | A | | 5/1994 | Payne |
| 5,563,499 | A | * | 10/1996 | Pinney ............ 323/266 |
| 6,130,526 | A | * | 10/2000 | Yang et al. ........ 323/272 |
| 6,218,817 | B1 | * | 4/2001 | Chang ............. 323/283 |
| 6,373,231 | B1 | | 4/2002 | Lacey et al. |
| 6,853,169 | B2 | * | 2/2005 | Burstein et al. .... 323/272 |
| 7,215,007 | B2 | * | 5/2007 | McKinzie et al. ... 257/664 |
| 7,292,015 | B2 | * | 11/2007 | Oswald et al. ..... 323/268 |
| 2003/0006650 | A1 | | 1/2003 | Tang et al. |
| 2003/0137286 | A1 | | 7/2003 | Kimball et al. |

OTHER PUBLICATIONS

Texas Instruments, "A single-supply op-amp circuit collection," Application Report SLOA058, Nov. 2000.*
Rich, Alan, "Understanding Interference-Type Noise," Analog Dialogue, Analog Devices, 1982, vol. 16-3, pp. 16-19.*
Horowitz & Hill, The Art of Electronics, Cambridge University Press, Second Edition, 1989, pp. 455-458.*
Sanders, Seth R. et al., "Active Clamp Circuits for Switchmode Regulators Supplying Microprocessor Loads", Power Electronics Specialists Conference, 1997. Pesc '97 Record., 28th Annual IEEE St. Louis, MO, USA, Jun. 22-27, 1997, New York, Y USA, IEEE, US, vol. 2, Jun. 22, 1997, pp. 1179-1185, XP010241697, ISBN: 0-7803-3840-5.
"PCT International Search Report of the International Searching Authority", mailed Jun. 21, 2006, for PCT/US2005/041352, 5pgs.

\* cited by examiner

*Primary Examiner*—Thomas Lee
*Assistant Examiner*—Albert Wang
(74) *Attorney, Agent, or Firm*—Buckley, Maschoff & Talwalkar LLC

(57) ABSTRACT

An apparatus includes a first voltage regulator that is controlled to provide an output voltage that matches a reference voltage. The apparatus further includes a second voltage regulator that is coupled to an output of the first voltage regulator and controlled to minimize a current output from the first voltage regulator.

20 Claims, 5 Drawing Sheets

PARALLEL-CONNECTED VOLTAGE REGULATORS FOR SUPPLYING POWER TO INTEGRATED CIRCUIT SO THAT SECOND REGULATOR MINIMIZES CURRENT OUTPUT FROM FIRST REGULATOR

BACKGROUND

The power requirements for an integrated circuit (IC) such as a microprocessor are typically provided via a voltage regulator (VR). However, there are conflicting objectives in the design of voltage regulators for ICs. On one hand, the thermal design current (TDC) specification calls for a certain degree of efficiency in the VR. On the other hand, the transient load line (LL) specification requires a fast response time of the VR. Since fast response time in a VR generally comes at the expense of efficiency, it typically has not been possible to optimize a VR for both efficiency and response time.

Dual VR solutions have been proposed, but the control arrangements for dual VRs have been complex and unsatisfactory.

DETAILED DESCRIPTION

Figure 1:
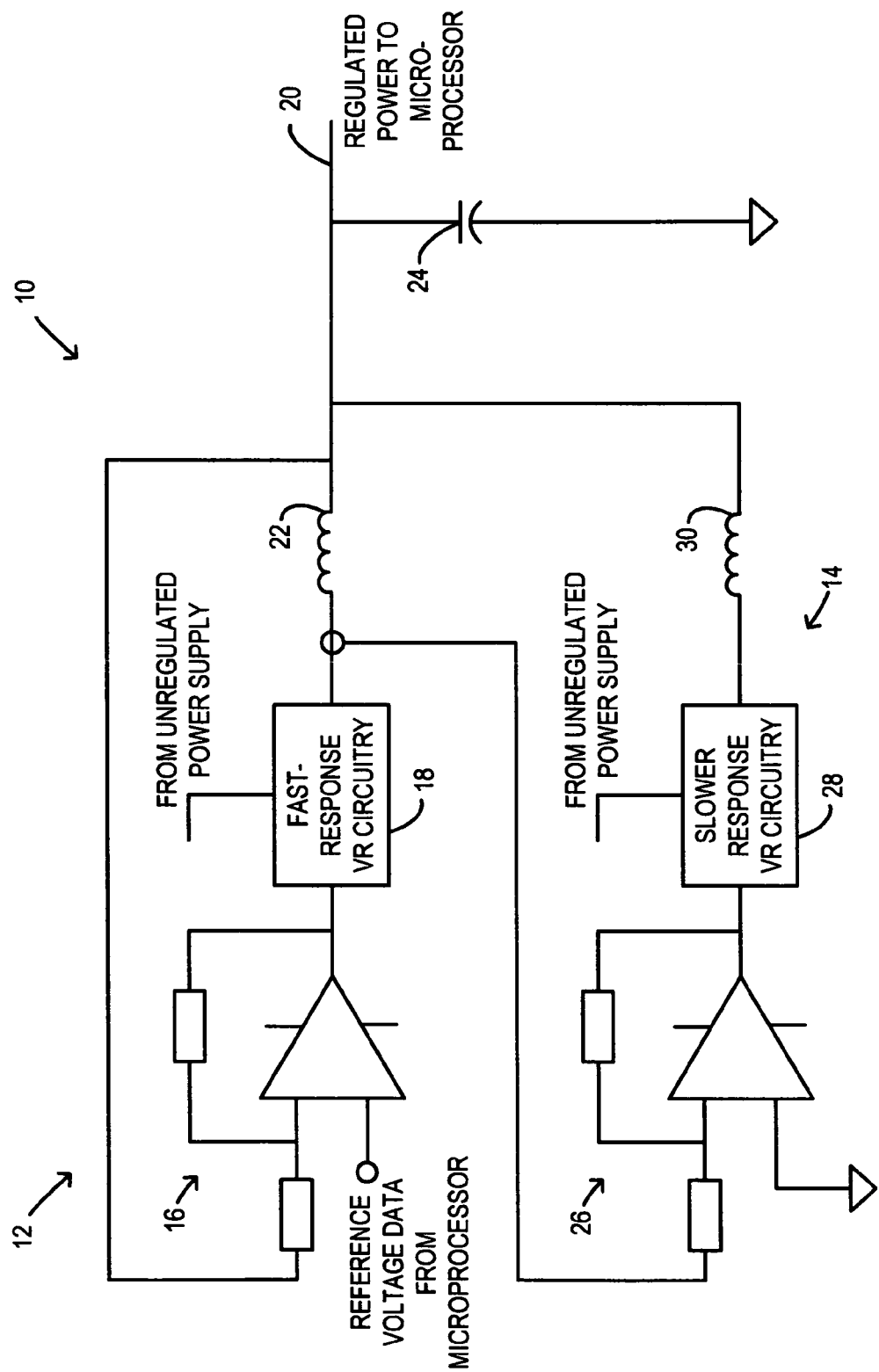
FIG. 1 is a conceptual schematic illustration of a dual voltage regulator provided in accordance with some embodiments to supply power to an IC.

FIG. 1 is a conceptual schematic illustration of a dual voltage regulator 10 provided in accordance with some embodiments to supply power to an IC (not shown in FIG. 1). In some embodiments, the IC may be a conventional microprocessor.

The dual voltage regulator 10 may include a first voltage regulator 12 which exhibits a relatively fast response, and a second voltage regulator 14 which exhibits a slower response. The first voltage regulator 12 and the second voltage regulator 14 may be coupled in parallel to each other to supply regulated power to the IC.

The first voltage regulator 12 includes a control arrangement 16 and circuitry 18 which allows the first voltage regulator 12 to exhibit a fast response time. The circuitry 18 receives a regulated or unregulated power supply input (e.g., at a nominal 12 volts). In some embodiments the first voltage regulator 12 may be a switching converter, in which case the circuitry 18 may include an oscillator and one or more power transistors (both not separately shown). In accordance with a conventional topology for a switching converter, the oscillator may be controlled by the control arrangement 16 and may in turn control the power transistor. The switching frequency and/or other parameters of the oscillator may be optimized to meet the transient LL specification for the IC.

The circuitry 18 may be coupled to an output terminal 20 of the dual VR 10 via an inductor 22. A capacitor 24 (or more than one capacitor) is coupled between the output terminal 20 and ground. The output terminal 20 is coupled to the IC and serves as a source of regulated power for the IC.

The control arrangement 16 for the first voltage regulator 12 is illustrated as an operational amplifier with feedback, although other arrangements may be provided. The control arrangement is coupled to the output terminal 20 of the dual VR 10 to receive the output voltage of the dual VR as a feedback signal. The control arrangement 16 of the first voltage regulator 12 also receives as its other input a reference voltage signal (commonly referred to as "VID") from the IC. Thus the VID signal represents a reference voltage, and the control arrangement 16 compares the output voltage of the dual VR 10 with the reference voltage. The first voltage regulator 12 is controlled to provide an output voltage that matches the reference voltage. In embodiments where the first voltage regulator 12 is a switching converter, the control arrangement 16 controls the duty cycle of the first voltage regulator 12 to bring the output voltage of the dual VR 10 to match the reference voltage.

In other embodiments, the first voltage regulator 12 may be configured as a linear converter, in which case the inductor 22 may be omitted and an arrangement may be provided in the circuitry 18 to switch to ground on occasions when the first voltage regulator 12 is required to exhibit negative current at its output.

The second voltage regulator 14 includes a control arrangement 26 and circuitry 28 which causes the second voltage regulator 14 to exhibit a slower response time than the first voltage regulator 12. The circuitry 28 receives the same regulated or unregulated power supply input as the circuitry 18 of the first voltage regulator 12. The second voltage regulator 12 may be a switching converter (e.g., a "buck" converter) and thus the circuitry 28 may include an oscillator and one or more power transistors (both not separately shown). The oscillator may be controlled by the control arrangement 26 and may in turn control the power transistor. The switching frequency and/or other parameters of the oscillator may be such as to make the second voltage regulator 14 power efficient. Assuming that the first voltage regulator 12 is also a switching converter, the switching frequency of the second voltage regulator 14 may be slower than the switching frequency of the first voltage regulator 12.

The circuitry 28 may be coupled to the output terminal 20 of the dual VR 10 via an inductor 30.

The control arrangement 26 for the second voltage regulator 14 is illustrated as an operational amplifier with feedback, although other arrangements may be provided. The output current from the circuitry 18 of the first voltage regulator 12 is sampled or otherwise detected to provide a signal that indicates the output current of the first voltage regulator 12. The control arrangement 26 of the second voltage regulator 14 is coupled to the output of the circuitry 18 of the first voltage regulator 12 to receive as a feedback signal the output current level of the first voltage regulator 12. The other input of the control arrangement 26 of the second voltage regulator 14 is tied to ground. Accordingly, the second voltage regulator is controlled to minimize the current output from the first voltage regulator. The control arrangement 26 of the second voltage regulator 14 controls the duty cycle of the second voltage regulator 14 to keep the output current of the first voltage regulator 12 as close to zero as possible.

In operation, the second voltage regulator 14, with its relatively slow response time and relatively high efficiency, supplies most of the static load current for the IC. The first voltage regulator 12, with its relatively fast response time, supplies the transient current spikes required in response to changes in load from the IC. Because the second voltage regulator 14 operates to minimize the current sourced by the first voltage regulator 12, the effect of the relatively low efficiency of the first voltage regulator 12 is minimized and the dual voltage regulator 10 as a whole exhibits high efficiency. At the same time the dual voltage regulator 10 exhibits a fast response to load changes by virtue of the fast response of the first voltage regulator 12.

Figure 2:
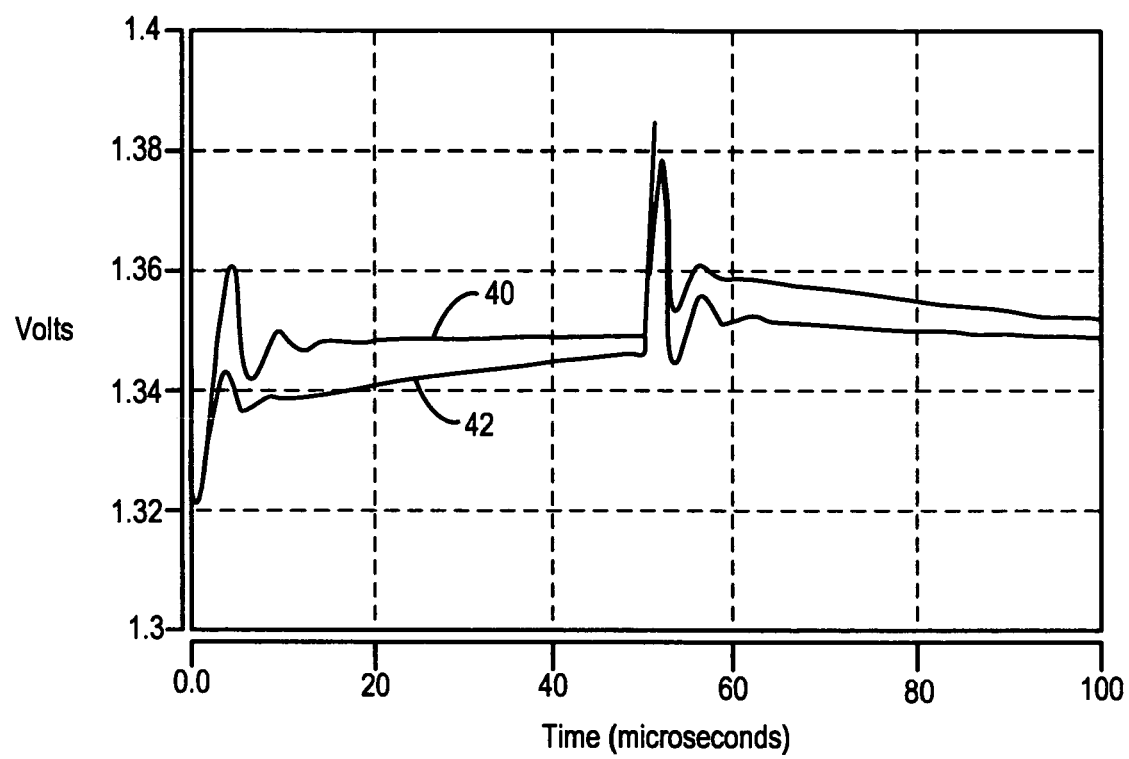
FIG. 2 is an illustration comparing simulated voltage waveforms of the dual VR of FIG. 1 and of a conventional VR.

FIG. 2 is an illustration which compares simulated voltage waveforms of the dual VR 10 and of a conventional VR (not shown). In FIG. 2, trace 40 is the simulated voltage waveform of the dual VR 10 and trace 42 is the simulated voltage waveform of a conventional single VR. It will be noted that the peaks of the trace 40 substantially match those of the trace 42, indicating that the performance of the dual VR 10 substantially matches the performance of a conventional VR in regard to spikes and droops in the supply voltage.

Figure 3:
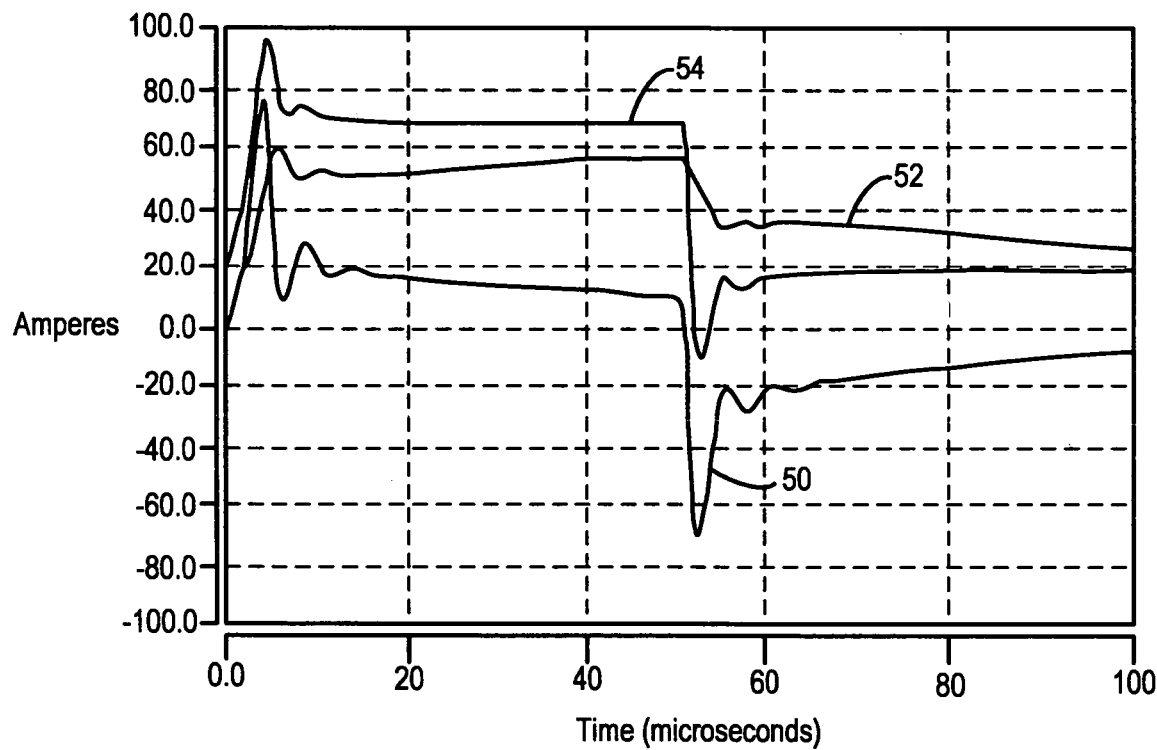
FIG. 3 is an illustration comparing simulated current waveforms of the constituent VRs of the dual VR of FIG. 1 and of a conventional VR.

FIG. 3 is an illustration which compares simulated current waveforms of the first voltage regulator 12, of the second voltage regulator 14, and of the conventional VR referred to in the preceding paragraph. In FIG. 3, trace 50 is the simulated current waveform of the first voltage regulator 12; trace 52 is the simulated current waveform of the second voltage regulator 14; and trace 54 is the simulated current waveform of the conventional VR. It will be noted from trace 52 that the second voltage regulator 14 supplies most of the continuous current. As indicated by trace 50, the first voltage regulator 12 supplies the transient current spikes with high di/dt (i.e., high rate of change of current). By contrast the conventional VR must supply both high continuous current and transient current spikes, and does so at a penalty in terms of efficiency.

Figure 4:
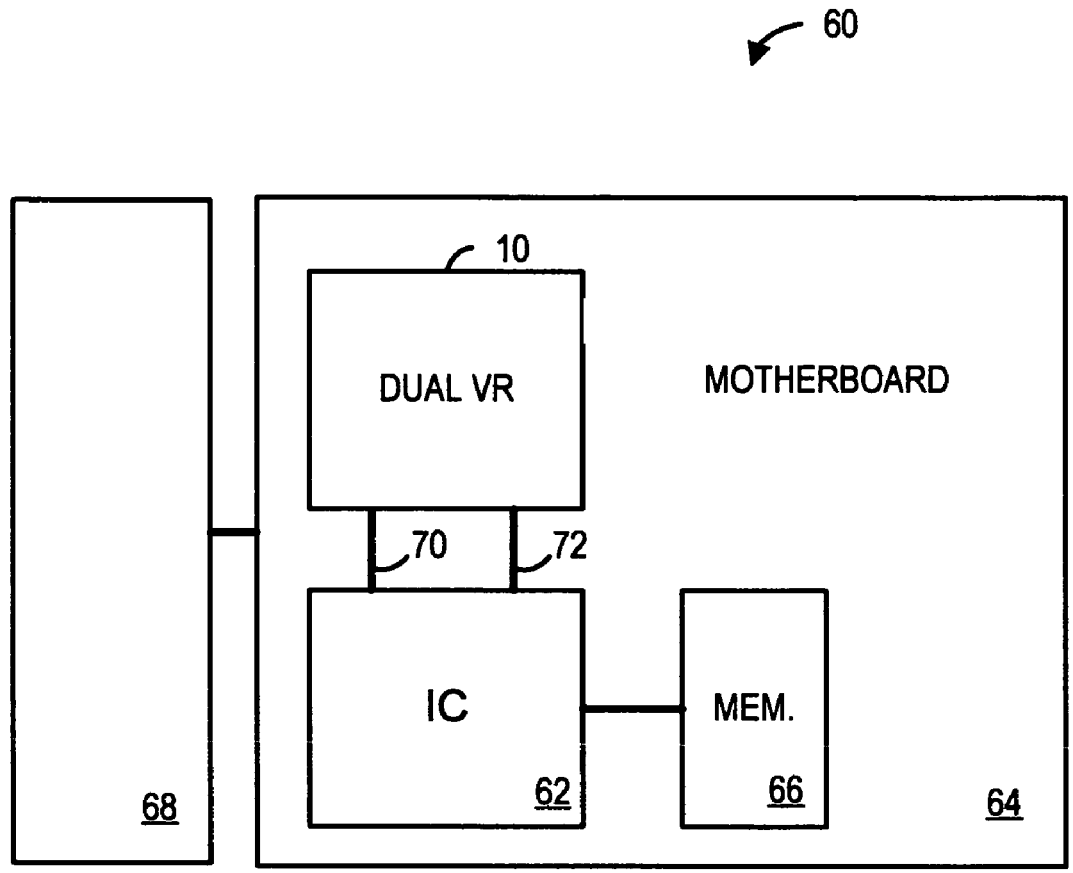
FIG. 4 is a plan view of a system according to some embodiments.

FIG. 4 is a plan view of a system 60 according to some embodiments. System 60 includes dual VR 10, IC 62, motherboard 64, memory 66 and (unregulated) power supply 68. System 60 may comprise components of a desktop computing platform, and memory 66 may comprise any type of memory for storing data, such as a Single Data Rate Random Access Memory, a Double Data Rate Random Access Memory, or a Programmable Read Only Memory. The IC 62 may be a conventional microprocessor in some embodiments. The memory 66 is coupled to the IC 62 to supply data and/or program instructions to the IC 62.

The dual VR 10 may be coupled to the IC 62 via a data signal path 70. The dual VR 10 (and particularly the first VR 12, FIG. 1) may receive the VID signal from the IC 62 via the data signal path 70. There is also a power signal connection 72 which couples the IC 62 to the dual VR 10. The dual VR 10 supplies regulated power to the IC 62 via the power signal connection 72.

The power supply 68 may provide the above-mentioned unregulated inputs to the circuitry 18 of VR 12 and to the circuitry 28 of VR 14.

Figure 5:
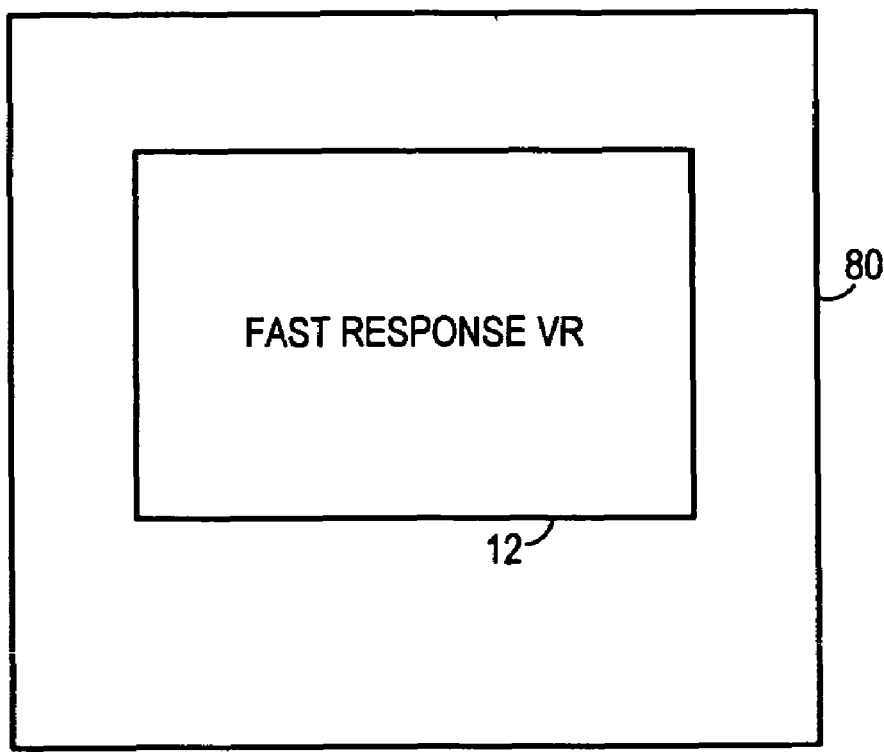
FIG. 5 is a schematic plan view of an IC package that may be part of other embodiments of a system.

In some embodiments, the dual VR and/or one of its constituent voltage regulators (VR 12 and/or VR 14) may be directly supported on the motherboard 64 or may be in a VR module (not separately shown) supported on the motherboard 64. In some embodiments, one or both of the VRs 12, 14 may be supported on the IC package 80 (FIG. 5). For example, the first VR 12 may be supported on the IC package 80, as shown in FIG. 5. Although not shown in FIG. 5, it will be understood that IC 62 may be contained in the IC package 80, and that the IC package 80 may be supported on the motherboard 64 (FIG. 4, not shown in FIG. 5).

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. An apparatus comprising:
    a first voltage regulator controlled to provide an output voltage that matches a reference voltage; and
    a second voltage regulator controlled to minimize a current output from the first voltage regulator, the second voltage regulator including a control circuit that includes a first input coupled to receive an output current level of the first voltage regulator and a second input coupled to a ground potential, said control circuit operative to compare the output current level received at the first input to the ground potential to which the second input is coupled, said second input not coupled to an oscillating signal.

2. The apparatus of claim 1, wherein the first voltage regulator includes a first switching converter and the second voltage regulator includes a second switching converter.

3. The apparatus of claim 2, wherein the first switching converter has a first switching frequency, and the second switching converter has a second switching frequency that is slower than the first switching frequency.

4. The apparatus of claim 1, wherein the first voltage regulator includes a linear converter and the second voltage regulator includes a switching converter.

5. The apparatus of claim 1, wherein at least one of the voltage regulators is supported by a motherboard to supply regulated power to an integrated circuit on the motherboard.

6. The apparatus of claim 1, wherein at least one of the voltage regulators is supported on a package of an integrated circuit to supply regulated power to the integrated circuit.

7. The apparatus of claim 1, wherein the first and second voltage regulators are coupled in parallel to each other to supply regulated power to an integrated circuit.

8. The apparatus of claim 7, wherein the integrated circuit is a microprocessor.

9. A method comprising:
    controlling a first voltage regulator to provide an output voltage that matches a reference voltage; and
    controlling a second voltage regulator to minimize a current output from the first voltage regulator, the second voltage regulator including a control circuit that includes a first input coupled to receive an output current level of the first voltage regulator and a second input coupled to a ground potential, said control circuit operative to compare the output current level received at the first input to the ground potential to which the second input is coupled, said second input not coupled to an oscillating signal.

10. The method of claim 9, wherein the first voltage regulator includes a first switching converter and the second voltage regulator includes a second switching converter.

11. The method of claim 10, wherein the first switching converter has a first switching frequency, and the second switching converter has a second switching frequency that is slower than the first switching frequency.

12. The method of claim 9, wherein the first voltage regulator includes a linear converter and the second voltage regulator includes a switching converter.

13. The method of claim 9, wherein at least one of the voltage regulators is supported by a motherboard to supply regulated power to an integrated circuit on the motherboard.

14. The method of claim 9, wherein at least one of the voltage regulators is supported on a package of an integrated circuit to supply regulated power to the integrated circuit.

15. The method of claim 9, wherein the first and second voltage regulators are coupled in parallel to each other to supply regulated power to an integrated circuit.

16. The method of claim 15, wherein the integrated circuit is a microprocessor.

17. A system comprising:

a microprocessor;

a first voltage regulator coupled to the microprocessor to provide to the microprocessor a power supply voltage that matches a reference voltage;

a second voltage regulator controlled to minimize a current output from the first voltage regulator, the second voltage regulator including a control circuit that includes a first input coupled to receive an output current level of the first voltage regulator and a second input coupled to a ground potential, said control circuit operative to compare the output current level received at the first input to the ground potential to which the second input is coupled, said second input not coupled to an oscillating signal; and a double rate memory coupled to the microprocessor.

18. The system of claim 17, wherein the first voltage regulator includes a first switching converter and the second voltage regulator includes a second switching converter.

19. The system of claim 18, wherein the first switching converter has a first switching frequency, and the second switching converter has a second switching frequency that is slower than the first switching frequency.

20. The system of claim 17, wherein the first voltage regulator includes a linear converter and the second voltage regulator includes a switching converter.

* * * * *